Dec. 27, 1927.
P. M. BONDERSKY
1,654,405
AUTOMOBILE BUMPER AND BRAKE DEVICE
Filed April 5, 1927
3 Sheets-Sheet 2
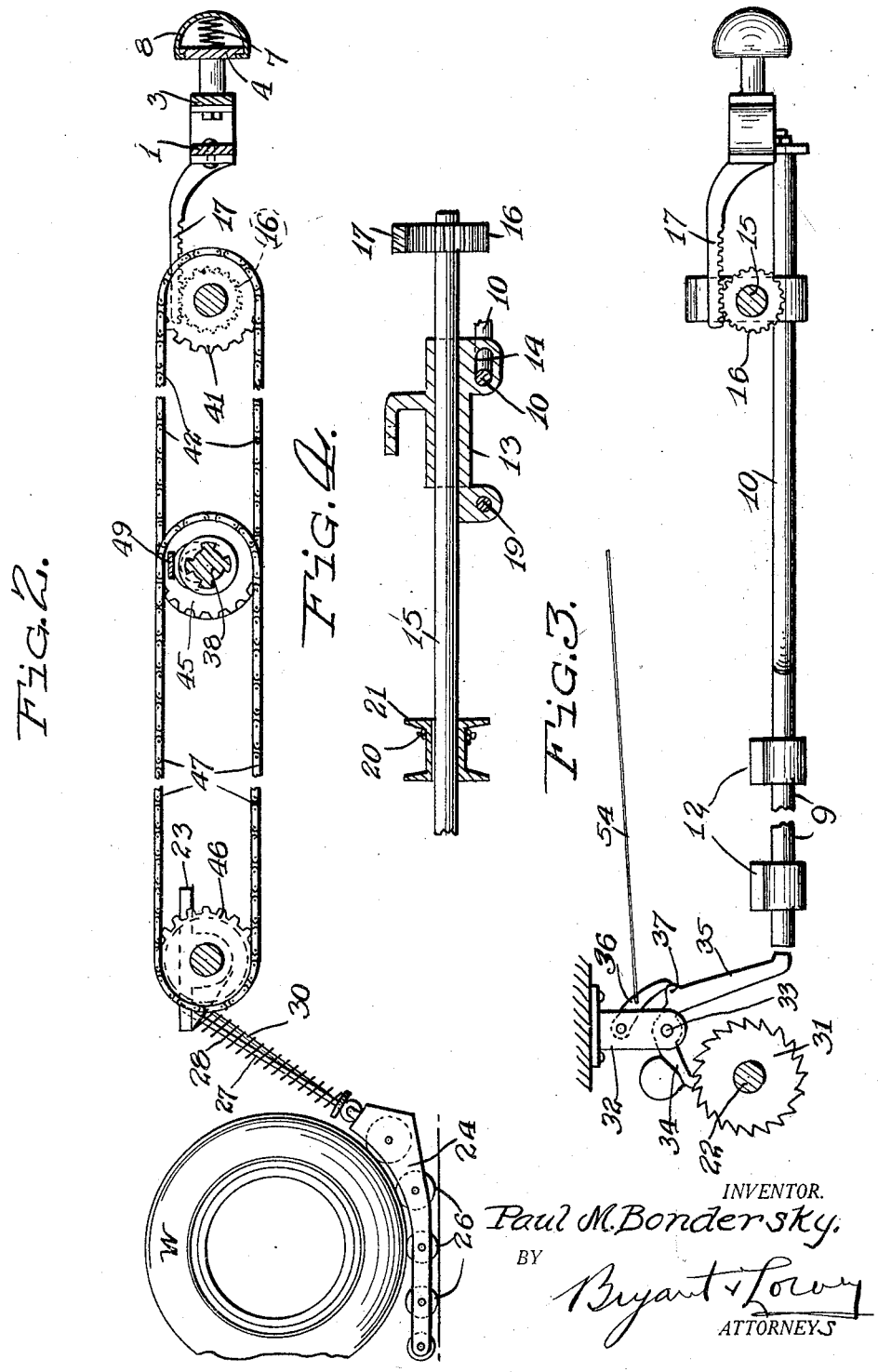
INVENTOR.
Paul M. Bondersky,
BY
Bryant + Lowry
ATTORNEYS

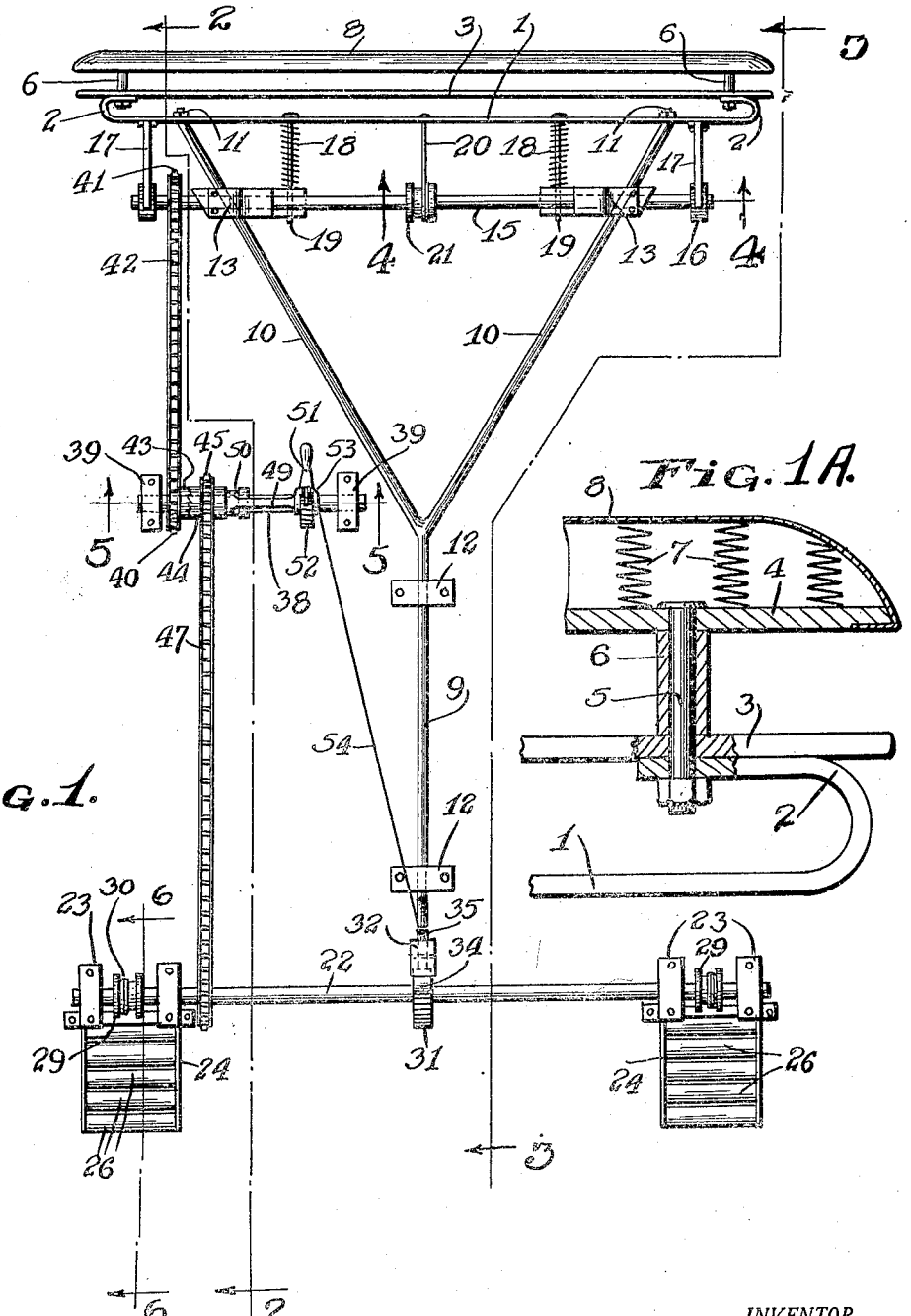

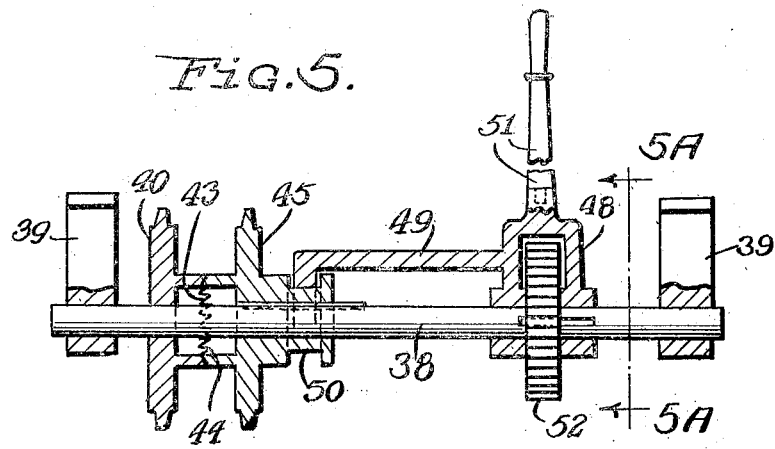
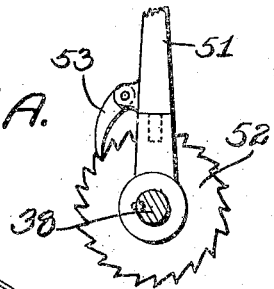
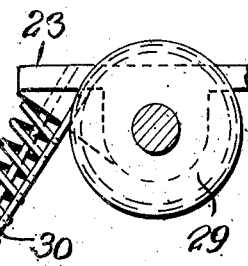
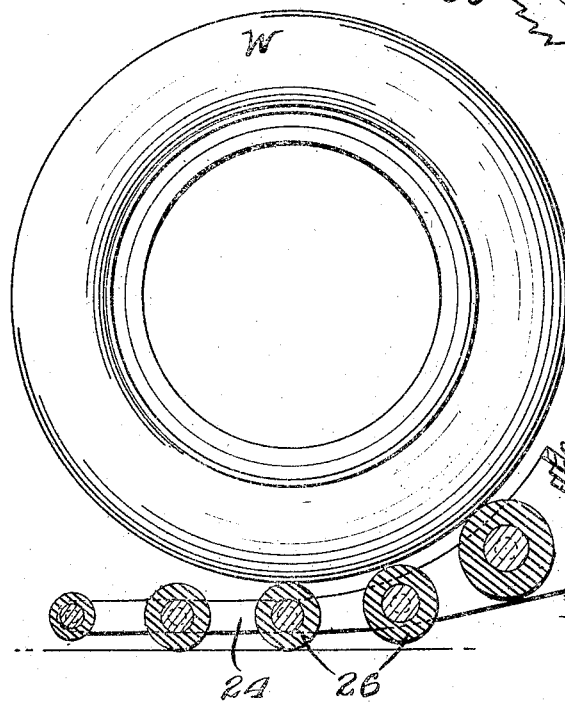

Patented Dec. 27, 1927.

1,654,405

UNITED STATES PATENT OFFICE.

PAUL M. BONDERSKY, OF CHICAGO, ILLINOIS, ASSIGNOR OF ONE-HALF TO JOHN HERDA, OF CHICAGO, ILLINOIS.

AUTOMOBILE BUMPER AND BRAKE DEVICE.

Application filed April 5, 1927. Serial No. 181,224.

This invention relates to certain new and useful improvements in a combined automobile bumper and wheel brake and has for its primary object to provide a bumper bar located forwardly of the front wheels of the automobile and normally elevated brake shoes disposed forwardly of the rear wheels of the automobile with mechanism connecting the bumper bar and brake shoes to cause the brake shoes to be lowered to operative positions with respect to the rear wheels of the automobile when the forwardly positioned bumper bar is rendered operative by contacting an abutment or the like.

A further object of the invention is to provide a combined bumper bar and brake mechanism wherein the brake shoe mechanism may be operated independently of the bumper bar by disconnecting the mechanism connecting the bumper and brake shoes, the brake shoes being elevated to their inoperative elevated positions by manually operable devices.

With the above and other objects in view that will appear as the nature of the invention is better understood, the same consists in the novel form, combination and arrangement of parts and in the details of construction hereinafter more fully described shown in the accompanying drawings and claimed.

In the accompanying drawings wherein like reference characters indicate corresponding parts throughout the several views, Figure 1 is a top plan view of the combined bumper bar and brake shoe mechanism showing the operating chain and sprocket connection between the bumper and brake shoes;

Figure 1ᵃ is an enlarged fragmentary top plan view, partly in section of one end of the bumper bar;

Figure 2 is a longitudinal sectional view taken on line 2—2 of Figure 1 showing the brake shoe lowered to its operative position and disposed beneath the rear wheel of the automobile;

Figure 3 is a longitudinal section view taken on line 3—3 of Figure 1 showing the pawl and ratchet mechanism for holding the brake shoes in elevated inoperative position;

Figure 4 is a detail sectional view taken on line 4—4 of Figure 1;

Figure 5 is a cross-sectional view taken on line 5—5 of Figure 1 showing the clutch mechanism of the connecting devices between the bumper bar and brake shoes;

Figure 5ᵃ is a detail sectional view taken on line 5ᵃ—5ᵃ of Figure 5; and

Figure 6 is an enlarged sectional view taken on line 6—6 of Figure 1 showing the spring device for lowering the brake shoe to its operative position.

Referring more in detail to the accompanying drawings, and particularly to Figures 1 and 1ᵃ, the bumper bar and its associated structure as disclosed in said figures comprises the bumper bar 1 having forwardly and inwardly bent outer ends 2 to which a straight forward bumper bar 3 is connected. A forwardly positioned bumper plate 4 is secured to the bumper bar 3 and ends 2 of the bumper bar 1 by the bolt 5 passing through the bumper bars and plates with the spacing collar 6 enclosing the bolt separating the bumper plate 4 from the bumper bar 3. The bumper plate 4 is cushioned by the coil springs 7 that are covered by the fabric sheet 8 that is suitably anchored at its edges to the bumper plate 4 for absorbing shock and minimizing injury.

The holding and supporting devices for the bumper bar construction above described comprises a triangular frame having a rear rod 9 and forwardly diverging rods 10, the forward ends of the rods 10 being secured at 11 to the bumper bar 1. The rear rod 9 is slidable through bearing blocks 12 carried by the underside of the automobile body while the forward divergent rods 10 are slidable through bearing blocks 13 shown more clearly in Figures 1 and 4 that are also secured to the underside of the automobile body. The bearing blocks 13 are provided with horizontally disposed elongated slots 14 to provide for sliding movement of the divergent rods 10. The bumper bar mechanism is rigidly supported by the triangualr frame comprising the rods 9 and 10 and said triangular frame is supported in the bearing blocks 12 and 13 carried by the underside of the automobile body.

As shown in Figures 1 and 4 a cross shaft 15 is journaled in the bearing blocks 13 and each end of the cross shaft 15 carries a pinion 16. A rack bar 17 with teeth upon its lower side is carried by each end of the bumper bar 1 and projects rearwardly thereof for engagement with the adjacent pinion 16. It will therefore be seen that when the bumper bar construction is moved rearwardly, the shaft 15 is rotated. The bumper bar construction is normally influenced in a forward direction of movement by the coil springs 18 extending between the bumper bar 1 and bearing blocks 13 as shown in Figure 1 and said springs are guided by the bolts 19 that are fixed at their forward ends to the bumper bar 1, the rear ends thereof sliding through openings in the bearing blocks 13. To limit the forward projecting movement of the bumper bar construction under the influence of the springs 18, there is provided a cable 20 or other flexible connection that is secured at one end centrally of the bumper bar 1 while its other end is wound upon the drum 21 fixed to the cross shaft 15. When the bumper bar construction is moved rearwardly against the tension of the springs 18 and the cross shaft 15 is rotated by the rack and pinion mechanism, the flexible cable 20 is wound upon the drum 21 while the projecting movement of the bumper bar construction is limited by the length of the flexible cable 20.

A cross shaft 22 is journaled at its ends in bearings 23 adjacent the rear end of the automobile and forwardly of the rear wheels while a brake shoe is associated with each end of the cross shaft 22. Each brake shoe, as shown in Figures 1 and 6 comprises a U-shaped frame having side arms 24 connected by a rear cross arm 25 and between which side arms 24 cushion rollers 26 are journaled. A rod 27 projects upwardly from each end of the cross arm 25 to which the rods are secured and is guided in its sliding movements through the bearing brackets 23, a coil spring 28 inclosing each rod between the bearing bracket and brake shoe for normally forcing the brake shoe in a downward direction to assume the position illustrated in Figures 2 and 6 beneath the rear wheel W of the automobile. The devices for limiting the projecting movements of the spring 27 in lowering the brake shoe to its operative position comprises the drum 29 fixed to the cross shaft 22 and having the flexible cable 30 anchored at one of its ends to the drum while the other end of said cable is secured to the cross arm 25 of the brake shoe.

The devices for holding the brake shoes in their inoperative elevated positions are shown more clearly in Figures 1 and 3 and comprise the ratchet wheel 31 fixed to the cross shaft 22 intermediate its ends. The bracket 32 supported on the underside of the automobile body as shown in Figure 3 has a bell crank lever pivoted at its lower end as at 33, the weighted end 34 of the bell crank lever forming a ratchet hook while the other leg 35 of the bell crank lever forms an operating arm. The lower end of the bell crank leg 35 terminates in proximity of the rear end of the rod 9 of the triangular frame so that when the bumper bar construction is moved rearwardly, the frame rod 9 engages the operating lever or bell crank leg 35 to move the same on its pivot 33 to disengage the latch hook 34 from the ratchet wheel 31 and when disengaged, the springs 28 will downwardly project the brake shoes, the operative length of the cable. When the bell crank lever is operated by the rod 9 of the triangular frame for releasing the brake shoes and displacing the latch hook 34 from engagement with the ratchet wheel 31, the overbalanced latch hook 34 is retained in an elevated position disengaged from the ratchet wheel by the pawl 36 carried by the bracket 32 that gravitationally moves into engagement with the lug 37 upon the operating arm 35 of the bell crank lever, this construction being clearly shown in Figure 3.

Chain and sprocket mechanism extends between the forward cross shaft 15 and the rear cross shaft 22 for positively operating the last named shaft when the latch hook 34 is disengaged from the ratchet wheel 31 to assist the springs 28 in lowering the brake shoes while a part of the chain and sprocket mechanism is also employed for raising the brake shoes to their inoperative elevated positions. As shown more clearly in Figures 1 and 5 a cross shaft 38 is journaled in the bearings 39 adjacent the operator's seat and said shaft has a sprocket wheel 40 fixed thereto. A sprocket wheel 41 fixed to the forward cross shaft 15 is aligned therewith and both sprocket wheels are enclosed by the sprocket chain 42. One side of the sprocket wheel 40 carries a clutch face 43 that cooperates with a side clutch face 44 upon the sprocket wheel 45 that is splined on the shaft 38. The sprocket wheel 46 upon the rear crossshaft 22 is aligned with the sprocket wheel 45 and said sprocket wheels are enclosed by the sprocket chain 47. A collar 48 is loosely mounted on the shaft 38 and carries a laterally directed arm 49 that has a forked end which encloses the reduced neck portion 50 of the sprocket wheel 45 so that when the collar 48 is axially shifted on the shaft 38 the clutch element 44 of the sprocket wheel 45 is moved into and out of clutching engagement with such element 43 of the sprocket wheel 40. The collar 48 has an operating handle 51 detachably connected thereto. The collar 48 is of forked formation and straddles a sprocket wheel 52 that is splined on the shaft 38 and said removable handle 51 carries a pawl 53 that cooperates with the ratchet wheel 52.

When the brake shoes are in their raised and inoperative positions, the ratchet hook 34 is engaged with the ratchet wheel 31 to hold the rear cross shaft 22 against rotation while the bumper bar construction is forwardly projected by the springs 18. When the bumper bar is moved rearwardly, the triangular frame also moves rearwardly and the rod 9 thereof engages the operating lever 35 of the bell crank to disengage the ratchet hook from the ratchet wheel 31 and said ratchet hook is maintained disengaged by the pawl 36 engaging the lug 37 upon the operating lever 35. During this movement, the rack bars 17 operates the pinions 16 to rotate cross shaft 15 and rotary motion thereof is communicated to the cross shaft 22 through the chain and sprocket mechanism above described which causes lowering movement of the brake shoes which are further influenced by the coil springs 28 associated therewith and to be limited by the length of the flexible cables 30. When the brake shoes are positioned beneath the rear wheels W as shown in Figures 2 and 6, the rollers 26 are caused to rotate in a reverse direction as a further braking feature. In raising the brake shoes to their inoperative positions, the lever 51 is operated for disengaging the clutch elements 43 and 44 and at which time the springs 18 will cause the bumper bar construction that is forwardly projected the length of the flexible cable 20. The intermediate cross shaft 38 is then rotated by the pawl and ratchet mechanism 52 and 53 and the pawl 36 is disengaged from the operating arm lug 37 by the wire 54 extending between the pawl 36 and lever 51, whereupon the overbalanced ratchet hooks 34 will drop into engagement with the ratchet wheel 31. It is now believed that the construction and operation of the invention will at once be understood and while there is herein shown and described the preferred embodiment of the present invention, it is intended that various changes and details of construction may be accomplished without departing from the spirit and scope of the invention as claimed, it being observed that a tensioned body strap or harness may be provided for each occupant of the automobile to prevent the occupant from being thrown from the automobile in case of an accident.

What I claim as new is:—

1. In a combined automobile bumper and brake shoe, a bumper bar construction, brake shoes, operative connections between the bumper bar construction and brake shoes whereby the brake shoes are lowered upon rearward movement of the bumper and the operative connections being constructed to permit forward projection of the bumper while the brake shoes are in their lowered operative positions, the operative connections comprising chain and sprocket mechanism and a normally operable clutch device interposed in the chain and sprocket mechanism, and cables for limiting the forward projection of the bumper bar construction and the lowering movement of the brake shoes.

2. In a combined automobile bumper and brake shoe, a bumper bar construction, brake shoes, operative connections between the bumper bar construction and brake shoes whereby the brake shoes are lowered upon rearward movement of the bumper and the operative connections being constructed to permit operation of the brake shoes independently of the bumper bar construction, the operative connections comprising chain and sprocket mechanism and a normally operable clutch device interposed in the chain and sprocket mechanism, and cables for limiting the forward projection of the bumper bar construction and the lowering movement of the brake shoes.

3. In a combined automobile bumper and brake shoe, a bumper bar, brake shoes, a cross shaft journalled at the front and rear ends of the automobile, connections between the forward cross shaft and bumper to rotate the shaft upon rearward movement of the bumper, chain and sprocket mechanism extending between the shafts, cables on the rear shaft for holding the brake shoes elevated in inoperative positions and means for holding the rear shaft against rotation.

4. In a combined automobile bumper and brake shoe, a bumper bar, brake shoes, a cross shaft journalled at the front and rear ends of the automobile, connections between the forward cross shaft and bumper to rotate the shaft upon rearward movement of the bumper, chain and sprocket mechanism extending between the shafts, cables on the rear shaft for holding the brake shoes elevated in inoperative positions, a ratchet wheel on the rear shaft and a ratchet hook engaged therewith to hold the shaft against rotation.

5. In a combined automobile bumper and brake shoe, a bumper bar, brake shoes, a cross shaft journalled at the front and rear ends of the automobile, connections between the forward cross shaft and bumper to rotate the shaft upon rearward movement of the bumper, chain and sprocket mechanism extending between the shafts, cables on the rear shaft for holding the brake shoes elevated in inoperative positions, and means for holding the rear shaft against rotation, and means carried by the bumper for operating the last named means to release the rear shaft.

6. In a combined automobile bumper and brake shoe, a bumper bar, brake shoes, a cross shaft journalled at the front and rear ends of the automobile, connections between the forward cross shaft and bumper to rotate the shaft upon rearward movement of the bumper, chain and sprocket mechanism extending between the shafts, cables on the rear shaft for holding the brake shoes elevated in inoperative position, a ratchet wheel on the rear shaft and a ratchet hook engaged therewith to hold the shaft against rotation, and means carried by the bumper to engage the ratchet hook for releasing the same from the ratchet wheel.

7. In a combined automobile bumper and brake shoe, a bumper bar, brake shoes, a cross shaft journalled at the front and rear ends of the automobile, connections between the forward cross shaft and bumper to rotate the shaft upon rearward movement of the bumper, chain and sprocket mechanism extending between the shafts, cables on the rear shaft for holding the brake shoes elevated in inoperative position, a ratchet wheel on the rear shaft and a ratchet hook engaged therewith to hold the shaft against rotation, means carried by the bumper to engage the ratchet hook for releasing the same from the ratchet wheel, means for retaining the ratchet hook in disengaged position and releasing means for the last named means.

In testimony whereof I affix my signature.

PAUL M. BONDERSKY.